United States Patent [19]

Nishida

[11] 4,095,823

[45] Jun. 20, 1978

[54] AUTOMATIC SIDE STAND RETREATING DEVICE FOR MOTORCYCLE

[75] Inventor: Tsutomu Nishida, Akashi, Japan

[73] Assignee: Kawasaki Jukogyo Kabushiki Kaisha, Japan

[21] Appl. No.: 785,567

[22] Filed: Apr. 7, 1977

[30] Foreign Application Priority Data

May 7, 1976 Japan .................................. 51-57755

[51] Int. Cl.² ............................................. B62H 1/02
[52] U.S. Cl. .................................. 280/764; 280/301; 280/755
[58] Field of Search ............... 280/762, 763, 764, 766, 280/755, 301

[56] References Cited

U.S. PATENT DOCUMENTS 2,300,762  11/1942  Andrews ............................... 280/301
2,479,763   8/1949  Morris ................................. 280/301

Primary Examiner—Richard A. Bertsch

[57] ABSTRACT

A device adapted for automatically retreating a side stand of a motorcycle when the motorcycle is started to drive is disclosed, which includes a spring normally urging the side stand in a direction of being deflected towards a retreated position; a lock member for retaining the side stand in a service position; a rotary member having a projection thereon and adapted to rotate when the motorcycle is started to run; a lever pivotally supported by a pin mounted on the body of the motorcycle and adapted to project within the passage of rotation of the projection; and a cable or rod interconnecting said lock member and said lever, such that, in association with the movement of said lever, caused by the rotation of the projection, in a direction to be retracted from the passage of rotation of the projection, said lock member is allowed to release the side stand.

15 Claims, 5 Drawing Figures

AUTOMATIC SIDE STAND RETREATING DEVICE FOR MOTORCYCLE

BACKGROUND OF THE INVENTION

This invention relates to a device for turning a side stand of a motorcycle from a service position to a retreated position.

If a motorcycle is started, with its side stand remaining upright, the side stand tends to impinge on the road surface, particularly when the motorcycle is turned to the side of the side stand, thus leading to the overturning of the motorcycle. To solve the problem described, an attempt has been made, in which, in the light of the fact that when the motorcycle is started a gear change by means of a clutch is effected, the side stand is set in a retreated position by utilizing part of the force of gear change operation. This method however results in a heavy and unsmooth gear change operation at the time of starting of the motorcycle.

SUMMARY OF THE INVENTION

It is accordingly an object of the present invention to provide a feasible automatical device for turning a side stand of a motorcycle from a service position to a retreated position.

Another object of the invention is to eliminate the above-mentioned drawbacks of the conventional devices.

It is a further object of the invention to provide a device for allowing a side stand of a motorcycle to be turned to a retreated position when the motorcycle starts to drive.

In accomplishing the foregoing objects, there has been provided according to the present invention a device for turning a pivotally attached side stand of a motorcycle from a service position to a retreated position, wherein rotation of a rotary member such as a sprocket, a hub of a wheel is utilized. The device of the invention includes means for urging the side stand in a direction towards said retreated position; a first lever member adapted to be shifted between a release position and a lock position, said first lever member including a lock member adapted for retaining the side stand in said service position when the first lever member is in said lock position; means for urging the first lever member in a direction towards said lock position; stopper means connected to the side stand for retaining the first lever member in said release position when the side stand is positioned in said retreated position; a projection member rigidly provided on a rotary member of the motorcycle for rotation therewith; a second lever member adapted to be shifted between a contact position at which the second lever member is positioned within the passage of rotation of the projection member and a retracted position at which the second lever member is not brought into contact with the rotating projection member, said first and second lever members being interconnected with each other through a connecting means such that shifting of the second lever member to said retracted position results in shifting of the first lever member to said release position whereas shifting of the first lever member to said lock position results in shifting of the second lever member to said contact position.

Further objects, features and advantages of the invention will become apparent as the invention is described more particularly hereafter in conjunction with a preferred embodiment of the invention, reference being had to the accompanying drawings.

DETAILED DESCRIPTION OF THE INVENTION

Figure 1:
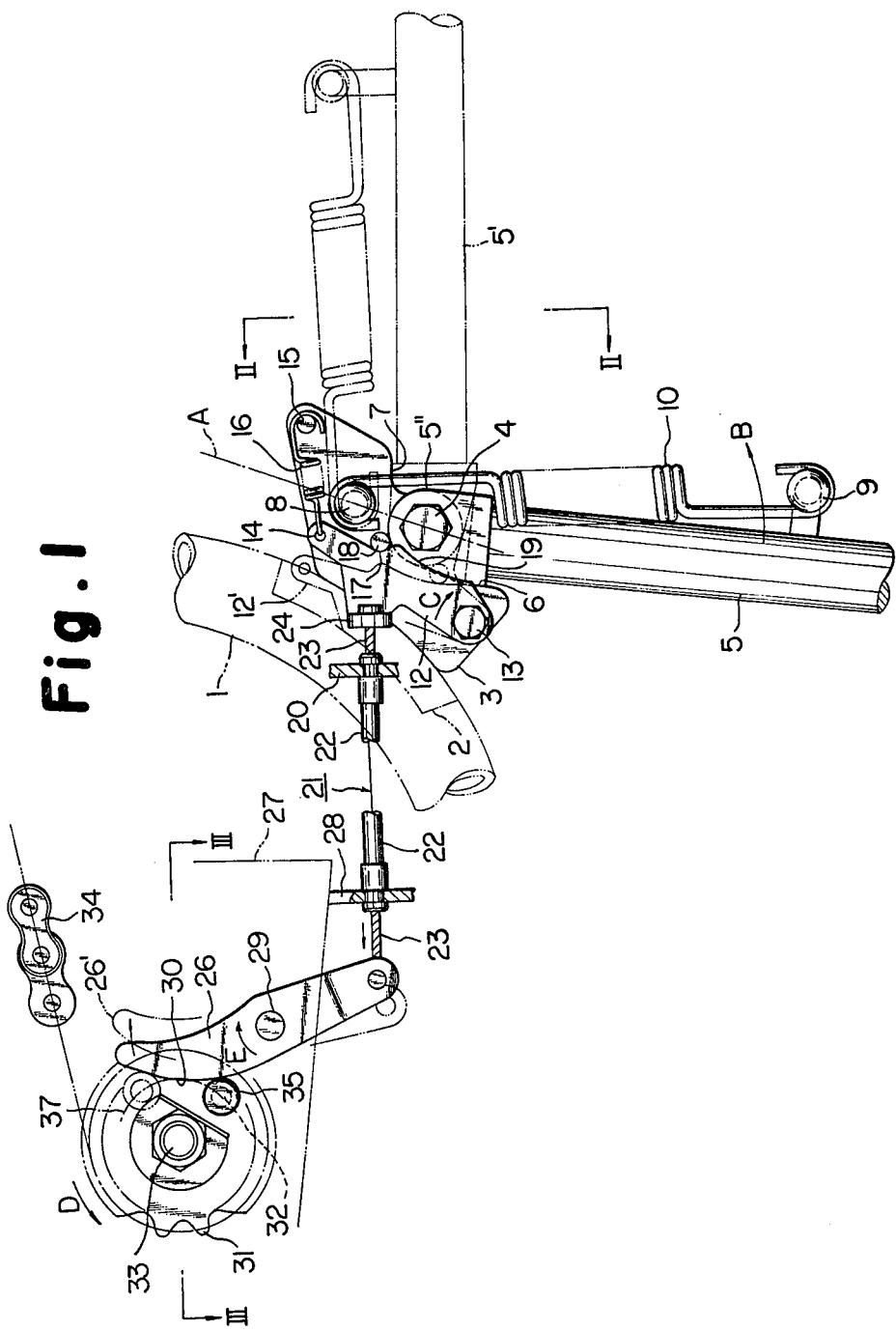
FIG. 1 is a fragmentary side view of the automatical side stand turning device of the invention, provided on a motorcycle.
Figure 2:
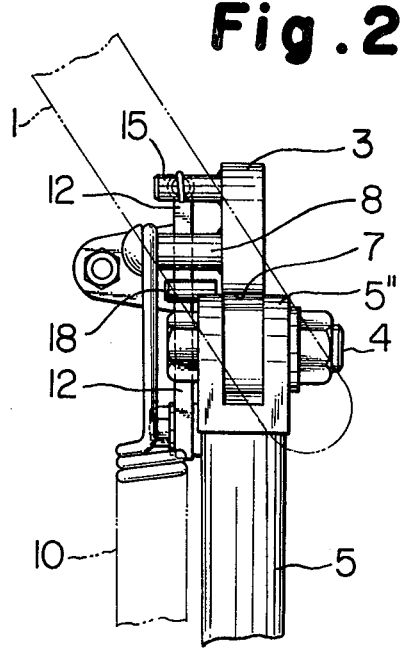
FIG. 2 is a fragmentary vertical sectional view, taken in the line II — II of FIG. 1.

Referring FIGS. 1 and 2 a side stand 5 is pivotally supported by a support shaft 4 preferably mounted on a bracket 3 which is welded through the mediacy of a reinforcing plate 2 to a frame 1 of a motorcycle. The bracket 3 has a stopper face 6 against which the side stand 5 is urged, when assuming a raised-up, service position as shown by a solid line in FIG. 1, and another stopper face 7 against which the side stand 5 is urged, when assuming a horizontal, retreated position as shown by a broken line 5'. A spring 10 is confined between a pin 8 provided on the bracket 3 and a pin 9 provided on the side stand 5, and normally urges the side stand 5 in a direction to be deflected towards the retreated position. Stated otherwise, since the pin 9 is deflected rearwards (rightwards as viewed in FIG. 1) of a line A interconnecting the center of the pin 8 and that of the shaft 4, the side stand 5 normally receives from the spring 10 a moment in a direction of arrow B.

Figure 3:
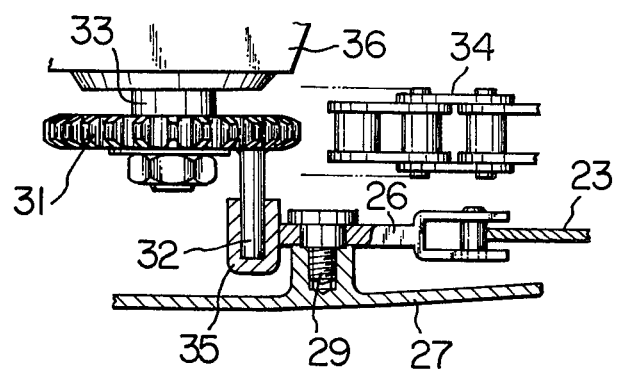
FIG. 3 is a fragmentary horizontal sectional view, taken in the line III — III of FIG. 1.

The side stand 5, although same is exerted with the force of being deflected towards the retreated position, may be held in the service position as shown by a solid line, by means of a lock arm 12. The lock arm 12 is pivotally supported by a shaft 13, which in turn is mounted on the bracket 3 in parallel with the shaft 4, and receives a moment in a direction of arrow C by the action of a spring 16, which is confined between a hole 14 provided in one end portion of the lock arm 12 and a pin 15 provided on the bracket 3. The lock arm 12 has a shoulder portion 17, with which a lock pin 18 may be maintained in engagement. The lock pin 18 is welded to the outer peripheral portion of a boss portion 5" of the side stand 5, which sandwiches the bracket 3. The shoulder portion 17 has a smoothly curved contour. If, therefore, a rider gives a kick in the direction of arrow B to the side stand 5 when the motorcycle is prepared for starting, then the lock arm 12 is urged in the direction reverse to the direction of arrow C against the elasticity of the spring 16, thereby disengaging the shoulder portion 17 from the lock pin 18 and turning the side stand to the retreated position. The spring 16 is given strength sufficient to maintain the shoulder portion 17 and the lock pin 18 in engaging relation, i.e. in a lock position, even if the motorcycle is raised upright and the load of motorcycle exerted on the side stand is released therefrom. Accordingly, the side stand, once such engagement is established, is maintained in the service position, unless special forces are applied to the side stand or the lock arm. Shown at 19 is a cam face of the lock arm. When the side stand 5 is urged in the direction of arrow B to assume the retreated position, the lock pin 18 is slidingly shifted along the cam face 19, whereby the lock arm 12 reaches a release position 12' against the elasticity of the spring 16 and is maintained in that position. Referring to FIG. 1 and 3, a sprocket 31 is mounted on an output shaft 33, which in turn projects sideways of a crank case 36 in which a gearing mechanism is incorporated, so that a drive force may be transmitted from the sprocket 31 mounted on the output shaft 33 by way of a chain 34 to a sprocket (not shown) attached to a rear wheel of the motorcycle. On the side surface of the sprocket 31, there is provided a pin 32. The pin 32 extends in parallel with the output shaft 33 and is preferably covered in the free end portion there of with a resilient cap 35.

A lever 26 is pivotally supported by a shaft 29, which in turn is preferably mounted on the chain casing 27 is parallel with the pin 32. The lever has a smooth, arcuate cam face 30 which may project within the passage of rotation of the pin 32 provided on the side surface of the sprocket 31. Thus, the free end portion, preferably covered with a resilient cap, is adapted to engage the arcuate cam face 30 of the lever 26 (FIG. 3).

Shown at 21 is a Bowden wire which consists of an outer wire 22 and an inner wire 23. The outer wire 22 is attached at one end to a bracket 20 attached to the frame 1 and at the other end to a bracket 28 attached to a chain casing 27. The inner wire 23 is attached at one end to a bracket 24 for the lock arm 12 and at the other end to the lower end of the lever 26. The length of the inner wire 23 is so determined that, when the side stand assumes the service position in which the shoulder 17 and the lock pin 18 are in engagement, i.e. the lock arm is in the lock position, the cam face 30 of the lever 26 can enter a pitch circle on the locus of rotation of the pin 32 which is rotated with the sprocket. Conversingly, the inner wire 23 serves to provide such interrelation between the lever 26 and the lock arm 12 that when the side stand assumes the retreated position in which the shoulder 17 and the lock pin 18 are in disengagement, i.e. the lock arm 12 is in the release position, the cam face 30 of the lever 26 can not be brought into contact with the rotating pin 32.

Figure 4:
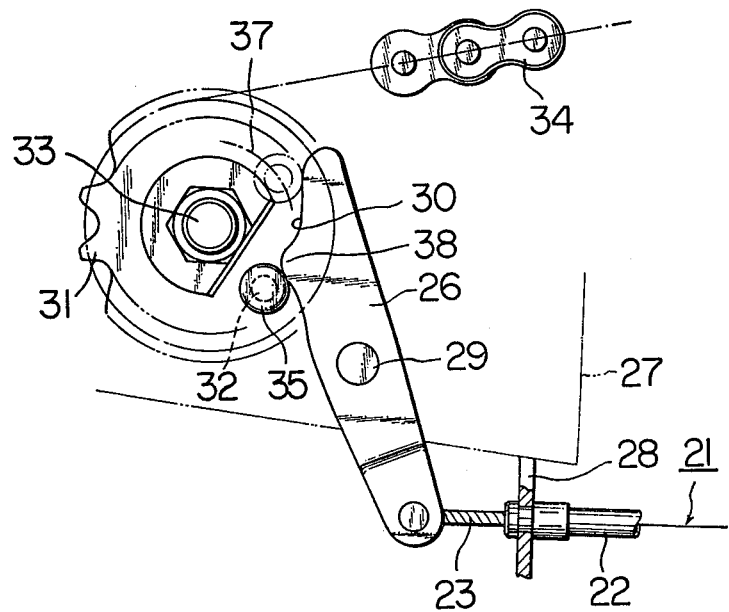
FIG. 4 is a fragmentary side view illustrating a preferred embodiment of a rotary member of a motorcycle.

If the motorcycle is started with the side stand 5 maintained in the service position shown by a solid line, then the sprocket 31 starts rotating slowly in the direction of arrow D. When the capped end 35 of the pin 32 is brought into engagement with the cam face 30 of the lever 26, the lever 26 is rotated about the shaft 29 in the direction of arrow E against the elasticity of the spring 16, thereby assuming a retreated position 26' retracted from the passage of the pin 32. The rotation in the direction of arrow E, of the lever 26 pulls the inner wire 23 leftwards as viewed in FIG. 1, whereby the lock arm 12 is rotated about the shaft 13 in the direction reverse to the direction of arrow C, thereby disengaging the shoulder portion 17 from the lock pin 18. Since the side stand 5 is normally exerted with the force of being deflected towards the retreated position by the elasticity of the spring 10, the side stand 5 is immediately urged about the shaft 4 in the direction of arrow B until same impinges against the stopper face 7, thus being retained in the retreated position. At this time, the lock pin 18 is slidingly shifted along the cam face 19 of the lock arm 12 to retain the lock arm 12 in the release position 12', whereby the inner wire 23 is maintained in a position to hold the lever 26 outside the passage of the pin 32, i.e. the retracted position.

Where it is desired to park the motorcycle in a certain place, the side stand 5 assuming the retreated position 5' is forced by a foot of a driver in the direction reverse to the direction of arrow B to the service position. Thus, the side stand 5 assumes the service position, and the load of motorcycle is applied thereto. Simultaneously with this movement, the lock pin 18 is slidingly shifted, by virtue of the spring 16, along the cam face 19 into engagement with the shoulder portion 17, while the lever 26 is rotated in the direction reverse to the direction of arrow E by the elasticity of the spring 16 until its cam face 30 enters the passage of the pin 32, and is positioned in such contact position as shown by a solid line in FIG. 1. When the side stand 5 is turned to the service position, if the pin 32 is positioned at a such point that the lever 26 would interfere with the pin 32, the lever can not be positioned in the contact position so that complete engagement between the shoulder portion 17 and the lock pin 18 will not be resulted. This, however, by no means impairs the movement of the side stand 5 to the service position. Such defective engagement between the shoulder portion and the lock pin is made up for with ease by advancing or backing the motorcycle only a short distance. For the convenience of adjustment, a projection 38 may be provided on the cam face 30 of the lever 26 as seen in FIG. 4, so as to reduce the distance of the motorcycle being advanced or backed for adjustment.

Since the load of motorcycle is exerted on the side stand 5 while the motorcycle is parked, a large moment acts on the side stand 5 about the shaft 4 in the direction reverse to the direction of arrow B, due to a reaction force from the ground which is received by the lower end of the side stand 5, with the result that the stopper face 6 is pressed under strong pressure on the side stand, thus providing the improved stability of the motorcycle when parked.

According to the present invention, the side stand 5 is given a tendency of normally being deflected towards the retreated position by the action of the spring 10, and the lock arm 12 holding the side stand 5 in the service position is actuated by the lever 26 adapted for turning when the motorcycle is started to move. With this arrangement, the shoulder portion 17 of the lock arm becomes automatically disengaged from the lock pin 18 when the motorcycle starts running in the advancing or backing direction, and hence the side stand 5 is automatically set in the retreated position. Thus, there is eliminated a dull and unsmooth gear change upon starting of the motorcycle which has been experienced with the prior art device. Stated otherwise, since the side stand 5 is automatically turned to the retreated position if the motorcycle is started, there is avoided the overturning of the motorcycle.

In embodying the present invention, a rod may be used, in place of a Bowden wire 21. The shaft 29 for supporting the lever 26 need not be in parallel with the output shaft 33, so far as the lever 26 is so arranged that its cam face projects to the passage of the pin 32 when the side stand assumes the service position. However, it is more advantageous from the standpoint of simplicity in construction to dispose the output shaft 33 and the shaft 29 in parallel relation. The rotary member may be a sprocket on the rear wheel or a hub of wheel.

Figure 5:
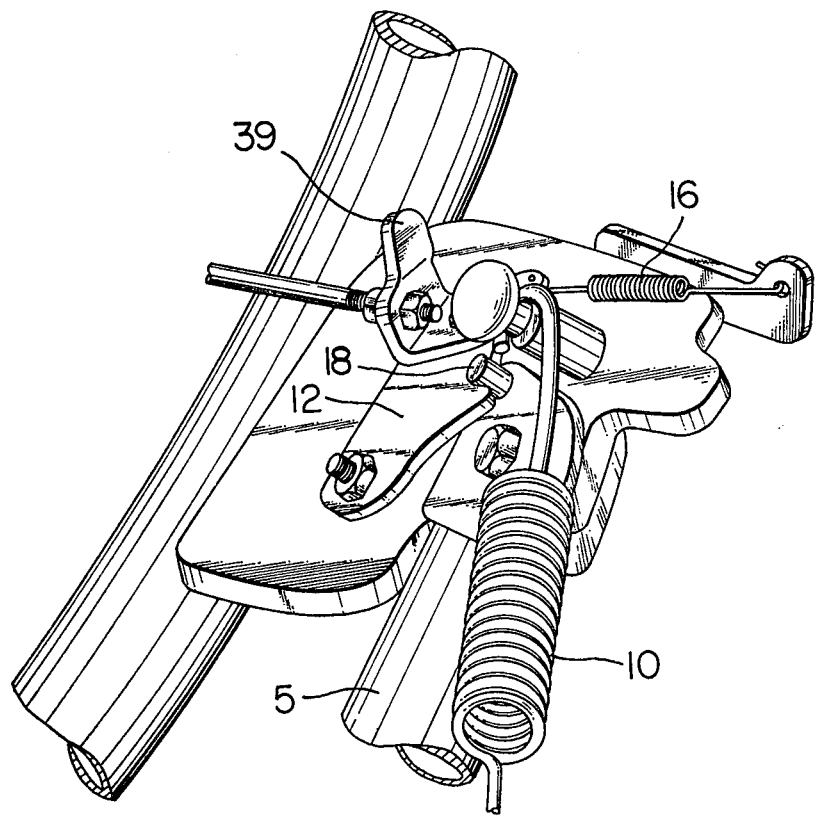
FIG. 5 is a fragmentary perspective view illustrating one of the embodiments of the device of the invention.

As an alternative, a manual lever 39 may be attached to the lock arm 12 as shown in FIG. 5. In this embodiment, the side stand 5 may be turned to the retreated position by pulling the manual lever 39 leftwards as viewed in FIG. 5, without moving the motorcycle.

What is claimed is:

1. A device for turning a pivoted side stand of a motorcycle from a service position to a retreated position, comprising
   means for urging the side stand in a direction towards said retreated position;
   a first lever member adapted to be shifted between a release position and a lock position, said first lever member including a lock member adapted for retaining the side stand in said service position when the first lever member is in said lock position;
   means for urging the first lever member in a direction towards said lock position;
   stopper means connected to the side stand for retaining the first lever member in said release position when the side stand is positioned in said retreated position;
   a projection member rigidly provided on a rotary member of the motorcycle for rotation therewith; and
   a second lever member adapted to be shifted between a contact position at which the second lever member is positioned within the passage of rotation of the projection member and a retracted position at which the second lever member is not brought into contact with the rotating projection member, said first and second lever members being interconnected with each other through a connecting means such that shifting of the second lever member to said retracted position due to the rotation of the projection member results in shifting of the first lever member to said release position whereas shifting of the first lever member to said lock position results in shifting of the second lever member to said contact position.

2. The device as defined in claim 1, wherein said side stand is pivotally supported by a pin on a bracket attached to the body of the motorcycle.

3. The device as defined in claim 2, wherein said side stand urging means is a spring member connected at one end to the side stand and another end to the bracket.

4. The device as defined in claim 1, wherein the side stand has a lock pin adapted to be engaged with the lock member of the first lever member when the first lever member is in said lock position.

5. The device as defined in claim 4, wherein the stopper means is said lock pin.

6. The device as defined in claim 1, wherein said first lever member urging means is a spring member.

7. The device as defined in claim 1, wherein said rotary member is a sprocket mounted on an output shaft of a gearing mechanism.

8. The device as defined in claim 1, wherein said rotary member is a sprocket provided on a rear wheel of the motorcycle.

9. The device as defined in claim 1, wherein said rotary member is a hub of a wheel.

10. The device as defined in claim 1, further comprising a resilient cap covering said projection member.

11. The device as defined in claim 1, wherein said second lever member is pivotally supported by a pin on the body of the motorcycle and has a cam face adapted for engaging with the projection member such that rotation of the projection member permits the second lever member to be turned from said contact position to said retracted position.

12. The device as defined in claim 11, wherein said cam face has a protrusion to minimize a range of rotation angle of the pin provided on the rotation member, within which range the second lever member is failed to be positioned in said contact position.

13. The device as defined in claim 1, wherein said connecting means is a Bowden wire.

14. The device as defined in claim 1, wherein said connecting means is a rod.

15. The device as defined in claim 1, wherein said first lever member includes a manual lever for manually turning said first lever member from said lock position to said release position.

* * * * *